(12) United States Patent
Zhou

(10) Patent No.: US 12,531,455 B2
(45) Date of Patent: Jan. 20, 2026

(54) ELECTRIC TOOL, MOTOR AND OPERATING HANDLE THEREOF

(71) Applicant: SHENZHEN TILSWALL INNOVATION TECHNOLOGY CO., LTD., Guangdong (CN)

(72) Inventor: Liang Zhou, Guangdong (CN)

(73) Assignee: SHENZHEN TILSWALL INNOVATION TECHNOLOGY CO., LTD., Guangdong (CN)

( * ) Notice: Subject to any disclaimer, the term of this patent is extended or adjusted under 35 U.S.C. 154(b) by 198 days.

(21) Appl. No.: 18/414,573

(22) Filed: Jan. 17, 2024

(65) Prior Publication Data

US 2025/0112522 A1    Apr. 3, 2025

Related U.S. Application Data

(63) Continuation of application No. PCT/CN2023/126003, filed on Oct. 23, 2023.

(30) Foreign Application Priority Data

Sep. 28, 2023   (CN) .......................... 202311290379.X

(51) Int. Cl.
| | |
|---|---|
| *H02K 7/14* | (2006.01) |
| *B25F 5/02* | (2006.01) |
| *H02K 7/00* | (2006.01) |

(52) U.S. Cl.
CPC .............. *H02K 7/145* (2013.01); *B25F 5/02* (2013.01); *H02K 7/003* (2013.01)

(58) Field of Classification Search
CPC ................................ H02K 7/145; H02K 7/003
(Continued)

(56) References Cited

U.S. PATENT DOCUMENTS

| | | |
|---|---|---|
| 2011/0272172 A1 | 11/2011 | Lau et al. |
| 2019/0063679 A1 | 2/2019 | Mergener |

FOREIGN PATENT DOCUMENTS

| | | | |
|---|---|---|---|
| CN | 1313173 A | | 9/2001 |
| CN | 207256026 U | * | 4/2018 |

(Continued)

OTHER PUBLICATIONS

International Search Report received in corresponding International Patent Application No. PCT/CN2023/126003, mailed May 24, 2024, 12 pages.

*Primary Examiner* — Jose A Gonzalez Quinones

(74) *Attorney, Agent, or Firm* — Cooper Legal Group, LLC

(57) ABSTRACT

A motor includes a motor body and a motor shaft with a first end connected to an inside of the motor body and a second end protruding out of the motor body, wherein a first cross section of the motor shaft perpendicular to its axial direction is non-circular, whose shape and size are matched with the shape and size of a second cross section of an assembly hole for shaft in an operating handle perpendicular to a depth direction thereof, and the assembly hole for shaft allows the motor shaft to extend into a transmission gear box of the operating handle for assembly, the motor body is provided with a connection structure for handle, and the connection structure for handle is configured to fit with a connection structure for motor at the operating handle, to realize a detachable assembly of the motor on the operating handle.

10 Claims, 12 Drawing Sheets

(58) Field of Classification Search
USPC .......................................................... 310/50
See application file for complete search history.

(56) References Cited

FOREIGN PATENT DOCUMENTS

| | | | |
|---|---|---|---|
| CN | 110153968 A | | 8/2019 |
| CN | 209239962 U | * | 8/2019 |
| CN | 211805948 U | | 10/2020 |
| CN | 212170302 U | | 12/2020 |
| CN | 112207770 A | | 1/2021 |
| CN | 214980790 U | | 12/2021 |
| CN | 215394920 U | | 1/2022 |
| CN | 217434265 U | | 9/2022 |
| KR | 20110108758 A | | 10/2011 |
| WO | 2014119756 A1 | | 8/2014 |

* cited by examiner

ELECTRIC TOOL, MOTOR AND OPERATING HANDLE THEREOF

CROSS-REFERENCE TO RELATED APPLICATION

This application is a continuation of PCT application serial no. PCT/CN2023/126003, filed on Oct. 23, 2023, which claims the priority and benefit of Chinese patent application serial no. 202311290379.X, filed on Sep. 28, 2023. The entirety of PCT application serial no. PCT/CN2023/126003 and Chinese patent application serial no. 202311290379.X are hereby incorporated by reference herein and made a part of this specification.

TECHNICAL FIELD

The application relates to the field of electromechanical technology, and in particular, to an electric tool, a motor and an operating handle thereof.

BACKGROUND ART

Electric tools are common tools in people's daily production and life. For example, in construction, decoration and other fields, various electric tools such as electric drills, electric hammers, and electric wrenches are indispensable. Compared with traditional tools, electric tools are more labor-saving and more efficient. However, at the same time, electric tools are also more expensive than traditional tools, especially those with high quality, whose prices remain high. For people who need to deal with electric tools for a long time, such as decoration workers, they generally need to prepare a variety of electric tools, so the cost of electric tools is a big expense for them. For people who only need to use electric tools occasionally, because they have less opportunities to use electric tools, they would rather use more laborious traditional tools for simple repairs than spend money to purchase a full set of electric tools.

Therefore, how to reduce the cost of electric tools is an urgent technical problem that needs to be solved.

SUMMARY

In order to reduce the cost of the electric tool, the application provides an electric tool, a motor and an operating handle thereof.

In a first aspect, the application provides a motor, which includes a motor body and a motor shaft with a first end connected to an inside of the motor body and a second end protruding out of the motor body.

A first cross section of the motor shaft perpendicular to its axial direction is non-circular, a shape and a size of a second cross section of an assembly hole for shaft in an operating handle are matched with a shape and a size of the first cross section, the second cross section is perpendicular to a depth direction of the assembly hole for shaft, and the motor shaft is configured to extend in a transmission gear box of the operating handle through the assembly hole for shaft for assembly.

The motor body is provided with a connection structure for handle, and the connection structure for handle is configured to fit with a connection structure for motor at the operating handle, to realize a detachable assembly of the motor on the operating handle.

According to the above technical solution, the shape and the size of the first cross section of the motor shaft of the motor are matched with the shape and the size of the second cross section of the assembly hole for shaft in the operating handle, furthermore, the motor body is provided with a connection structure for handle, which can fit with the connection structure for motor at the operating handle, so as to realize a detachable assembly of the motor on the operating handle. The motor provided by the application can be independent of the operating handle, and there is no binding relationship between the both. Therefore, when the same motor is mounted on different types of operating handles, different types of electric tools can be obtained. The user needs to purchase only one electric tool and a plurality of different types of operating handles to own different types of electric tools. Compared with purchasing a plurality of electric tools with independent motors, the cost of electric tools is greatly reduced in this way. At the same time, because the electric tool is obtained based on the combination of two independent products, namely the motor and the operating handle, the user only needs to repurchase the broken product after determining the cause of the failure when the electric tool fails. For example, if the motor fails, it is only necessary to repurchase a motor, and the operating handle can continue to be used. If the operating handle fails, it is only necessary to repurchase the corresponding operating handle while the motor can be remained, it is not necessary to repurchase the entire electric tool, which further reduces the using cost of the electric tool.

Optionally, the first cross section meets at least one of following conditions:
the first cross section is a polygon;
the first cross section is either a quadrilateral or of D-shape, and an outline of the D-shape is formed by a line segment and a curve connected end to end; or
at least part of vertex angles of the first cross section are rounded.

According to the above technical solution, when at least part of the vertex angles of the first cross section of the motor shaft are rounded, the impact of various bumps on the edges and corners of the motor shaft during a plurality of assembly and disassembly processes can be reduced, and the risk of the deformation of the motor shaft can be reduced. This enhances the quality of the motor and reduces the scratching on the assembly hole for shaft in the operating handle by the motor shaft during the disassembly and assembly process, which extends the service life of the motor and operating handle.

Optionally, the motor body includes a first assembly end, the motor shaft protrudes out from an end surface of the first assembly end, the first assembly end is configured to fit with a second assembly end of the operating handle, and an orifice of the assembly hole for shaft is defined on an end surface of the second assembly end.

The connection structure for handle includes a first connector at the first assembly end, the first connector is configured to fit with a second connector in the connection structure for motor, the second connector is arranged at the second assembly end, and the first connector fits with the second connector by at least one of following ways:
one of the first connector or the second connector includes an assembly boss, the other of the first connector or the second connector includes an assembly groove for fitting with the assembly boss; a plurality of snap joints are provided on a sidewall of the assembly boss, an elastic snap ring is arranged around the assembly groove in an inner sidewall of the assembly groove, wherein when the motor is being assembled, the assembly boss protrudes into the assembly groove, the elastic snap ring is hooped on the snap joints, and when the motor is being disassembled, the elastic snap ring is deformed under force, so that the snap joints can be withdrawn and separated from the elastic snap ring, or one of the first connector or the second connector includes an adjustable buckle, the other of the first connector or the second connector includes a limit socket, the adjustable buckle includes a body slab and a stopper of buckle fixed on the body slab, wherein when the motor is being assembled, the stopper of buckle is configured to protrudes into the limit socket and is engaged with the limit socket, and when the motor is being disassembled, the body slab is deformed under force, so as to bring the stopper of buckle to move out of the limit socket.

According to the above technical solution, the fitting manner between the first connector in the connection structure for handle and the second connector in the connection structure for motor is simple. The reliability of the connection between the motor and the operating handle can be ensured, while simplifying the assembly and disassembly, which is easy to implement, so as to improve the efficiency of the disassembly and assembly between the motor and the operating handle.

Optionally, the motor body is further provided with a connection structure for power receiving, the connection structure for power receiving is configured to be electrically connected to a connection structure for power supply on the operating handle after the motor is assembled, so as to supply power to the motor through the operating handle.

According to the above technical solution, when the motor assembly is completed, the connection structure for power receiving on the motor can be electrically connected to the connection structure for power supply on the operating handle, so that the motor can be powered through the operating handle. Therefore, the electrical connection between the both can also be established while assembling the motor and the operating handle, so that the user does not need to connect the motor with operating handle electrically on purpose after assembling the motor, which further reduces the assembly and use effort of the electric tool.

In a second aspect, the application provides an operating handle for an electric tool. The operating handle includes a transmission gear box and a holding handle, wherein the holding handle is fixedly connected to the transmission gear box.

An end of the transmission gear box that fits with an operation head of the electric tool is a front end, an end of the transmission gear box that fits with a motor is a rear end, the front end is provided with an operation head connector, the operation head connector is configured to connect the operation head, the rear end is configured with an assembly hole for shaft that fits with a motor shaft of the motor, a second cross section of the assembly hole for shaft is non-circular, a shape and a size of the second cross section are matched with a shape and a size of a first cross section of the motor shaft, the first cross section is perpendicular to an axial direction of the motor shaft, the second cross section is perpendicular to a depth direction of the assembly hole for shaft, and the assembly hole for shaft allows the motor shaft to extend into the transmission gear box for assembly.

The rear end is further provided with a connection structure for motor, and the connection structure for motor is configured to fit with a connection structure for handle at the motor, to realize a detachable assembly of the motor on the operating handle.

According to the above technical solution, the shape and the size of the second cross section of the assembly hole for shaft in the operating handle are matched with the shape and the size of the first cross section of the motor shaft in the motor. Furthermore, the connection structure for motor at the operating handle and the connection structure for handle at the motor can fit with each other, so as to realize the detachable assembly of the motor on the operating handle. The operating handle provided by the application can be independent of the motor, and there is no binding relationship between the both. Therefore, when the same motor is mounted on different types of operating handles, different types of electric tools can be obtained. The user needs to purchase only one electric tool and a plurality of different types of operating handles to own different types of electric tools. Compared with purchasing a plurality of electric tools with independent motors, the cost of electric tools is greatly reduced in this way. At the same time, because the electric tool is obtained based on the combination of two independent products, namely the motor and the operating handle, the user only needs to repurchase the broken product after determining the cause of the failure when the electric tool fails. For example, if the motor fails, it is only necessary to repurchase a motor, and the operating handle can continue to be used. If the operating handle fails, it is only necessary to repurchase the corresponding operating handle and the motor can be remained, it is not necessary to repurchase the entire electric tool, which further reduces the using cost of the electric tool.

Optionally, the second cross section meets at least one of following conditions:
    the second cross section is a polygon;
    the second cross section is either a quadrilateral or of D-shape, and an outline of the D-shape is formed by a line segment and a curve connected end to end; or
    at least part of vertex angles of the second cross section are rounded.

According to the above technical solution, when at least part of the vertex angles of the second cross section of the assembly hole for operating handle are rounded, correspondingly, at least part of the vertex angles of the first cross section of the motor shaft are rounded, the impact of various bumps on the edges and corners of the motor shaft during a plurality of assembly and disassembly processes can be reduced, and the risk of the deformation of the motor shaft can be reduced. This enhances the quality of the motor and reduces the scratching on the assembly hole for shaft in the operating handle by the motor shaft during the disassembly and assembly process, which extends the service life of the motor and operating handle.

Optionally, the rear end is a second assembly end of the operating handle, and the second assembly end is configured to fit with a first assembly end of the motor.

The connection structure for motor includes a second connector at the second assembly end, the second connector is configured to fit with a first connector in the connection structure for handle, the first connector is arranged at the first assembly end, and the first connector fits with the second connector by at least one of following ways:
    one of the first connector or the second connector includes an assembly boss, the other of the first connector or the second connector includes an assembly groove for fitting with the assembly boss; a plurality of snap joints are provided on a sidewall of the assembly boss, an elastic snap ring is provided around the assembly groove in an inner sidewall of the assembly groove, wherein when the motor is being assembled, the assembly boss protrudes into the assembly groove, the elastic snap ring is hooped on the snap joints, and when the motor is being disassembled, the elastic snap ring is deformed under force, so that the snap joints can be withdrawn and separated from the elastic snap ring, or one of the first connector or the second connector includes an adjustable buckle, the other of the first connector or the second connector includes a limit socket, the adjustable buckle includes a body slab and a stopper of buckle fixed on the body slab, wherein when the motor is being assembled, the stopper of buckle is configured to protrudes into the limit socket and is engaged with the limit socket, and when the motor is being disassembled, the body slab is deformed under force, so as to bring the stopper of buckle to move out of the limit socket.

According to the above technical solution, the fitting manner between the first connector in the connection structure for handle and the second connector in the connection structure for motor is simple. The reliability of the connection between the motor and the operating handle can be ensured while simplifying the assembly and disassembly, which is easy to implement, so as to improve the efficiency of the disassembly and assembly between the motor and the operating handle.

Optionally, the operating handle is further provided with a connection structure for feed and a connection structure for power supply electrically connected to the connection structure for feed, the connection structure for feed is configured to be electrically connected to an output end of a power source, and the connection structure for power supply is configured to be electrically connected to a connection structure for power receiving at the motor after the motor is assembled, so as to supply power to the motor.

According to the above technical solution, when the assembly of the motor is completed, the connection structure for power receiving at the motor can be electrically connected to the connection structure for power supply at the operating handle, so that the motor can be powered by the operating handle with the power source. Therefore, the electrical connection between the both can also be established while assembling the motor and the operating handle, so that the user does not need to connect the motor with operating handle electrically on purpose after assembling the motor, which further reduces the assembly and use effort of the electric tool.

Optionally, the operating handle is further provided with a battery fixing structure, the battery fixing structure is configured to fit with a handle fixing structure at a battery assembly, to realize a detachable assembly of the battery assembly on the operating handle, and the connection structure for feed is configured to be electrically connected to an output end of the battery assembly after the battery assembly is assembled.

One of the battery fixing structure or the handle fixing structure includes a coulisse, the other of the battery fixing structure or the handle fixing structure includes a convex slider for fitting with the coulisse, one of the battery fixing structure or the handle fixing structure further includes an elastic plug, the other of the battery fixing structure or the handle fixing structure further includes a socket for fitting with the elastic plug, wherein when the battery is being assembled, the convex slider slides into the coulisse through an end face of a first end of the coulisse and slides along the coulisse to a second end of the coulisse, the elastic plug is inserted in the socket, and when the battery assembly is being disassembled, the elastic plug is withdrawn from the socket under force, and the convex slider slides from the second end of the coulisse to the first end of the coulisse and slides out from the end surface of the first end.

According to the above technical solution, the motor can be powered by the operating handle also through the battery assembly, so that the operating range of the electric tool cannot be affected by the location of the external power source, which improves the flexibility in using of the electric tool. At the same time, because the operating handle fits detachably with the handle fixing assembly at the battery assembly through the battery fixing structure, the battery assembly can be decoupled from the operating handle. A same battery assembly can be mounted on different operating handles, and a same operating handle can also fit with different battery assemblies. The purchase and replacement of battery assemblies as well as the purchase and replacement of operating handles do not affect each other, which further reduces the using cost of electric tools.

In a third aspect, the application provides an electric tool, which includes the motor according to the first aspect and the operating handle according to the second aspect, wherein the motor is detachably connected to the operating handle.

According to the above technical solution, the electric tool is obtained based on the combination of two independent products, namely the motor and the operating handle. The motor is detachably assembled on the operating handle. In addition to driving the operating handle to work, the motor can also be assembled on other operating handles to form other electric tools. Similarly, the operating handle can also be adapted to other motors to form other electric tools. Therefore, the user only needs to repurchase the broken product after determining the cause of the failure when the electric tool fails. For example, if the motor fails, it is only necessary to repurchase a motor, and the operating handle can continue to be used. If the operating handle fails, it is only necessary to repurchase the corresponding operating handle and the motor can be remained, it is not necessary to repurchase the entire electric tool, which further reduces the using cost of the electric tool.

Optionally, the electric tool further includes an identification assembly, wherein the identification assembly includes a controller, a memory, a detection device and an output unit, the detection device, the output unit, and the memory are in communication with the controller respectively, the detection device includes at least one of a camera or an acoustic wave detector, the detection device is configured to detect a target material to be machined under a control of the controller, a variety of mapping relationships between detection data and material information are stored in the memory, the controller is configured to determine the material information of the target material to be machined based on the detection data of the detection device in combination with the mapping relationships stored in the memory, and the output unit is configured to output the material information of the target material to be machined under the control of the controller.

According to the above technical solution, the identification assembly is provided in the electric tool. The identification assembly can be configured to detect and identify the target material to be machined by the electric tool and output the result of the material detection, so that the user can flexibly select the corresponding type of the electric tool or replace the operating handle and operation head on the electric tool in time according to the target material, to avoid damage to the electric tool and affection on the work efficiency due to the incompatibility of the target material and the tool. This is beneficial to extend the service life of electric tools and improve the operating efficiency of users.

In summary, at least one of the following beneficial technical effects is realized:
1. The operating handle can be independent of the motor, and there is no binding relationship between the both. Therefore, when the same motor is mounted on different types of operating handles, different types of electric tools can be obtained. The user needs to purchase only one electric tool and a plurality of different types of operating handles to own different types of electric tools. Compared with purchasing a plurality of electric tools with independent motors, the cost of electric tools is greatly reduced in this way.
2. The replacement of the motor in the electric tool does not affect the operating handle, and the replacement of the operating handle does not affect the motor, which further reduces the using cost of the electric tool.

DETAILED DESCRIPTION

In order to make the objects, technical solutions and advantages of the application clearer, the application will be further described in detail below in conjunction with the accompanying drawings and the embodiments. It should be understood that the specific embodiments described here are only intended to explain the application but not intended to limit the application.

Figure 1:
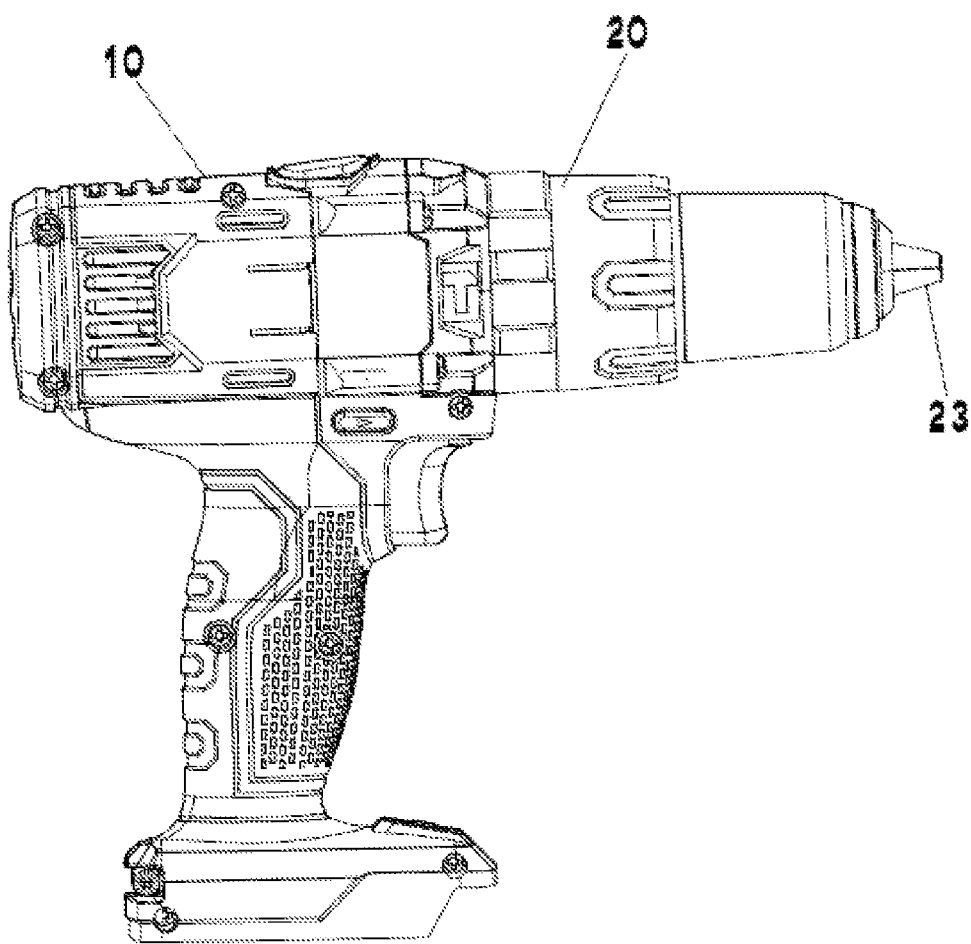
FIG. 1 is a schematic diagram of an electric tool according to an embodiment of the application from a perspective.
Figure 2:
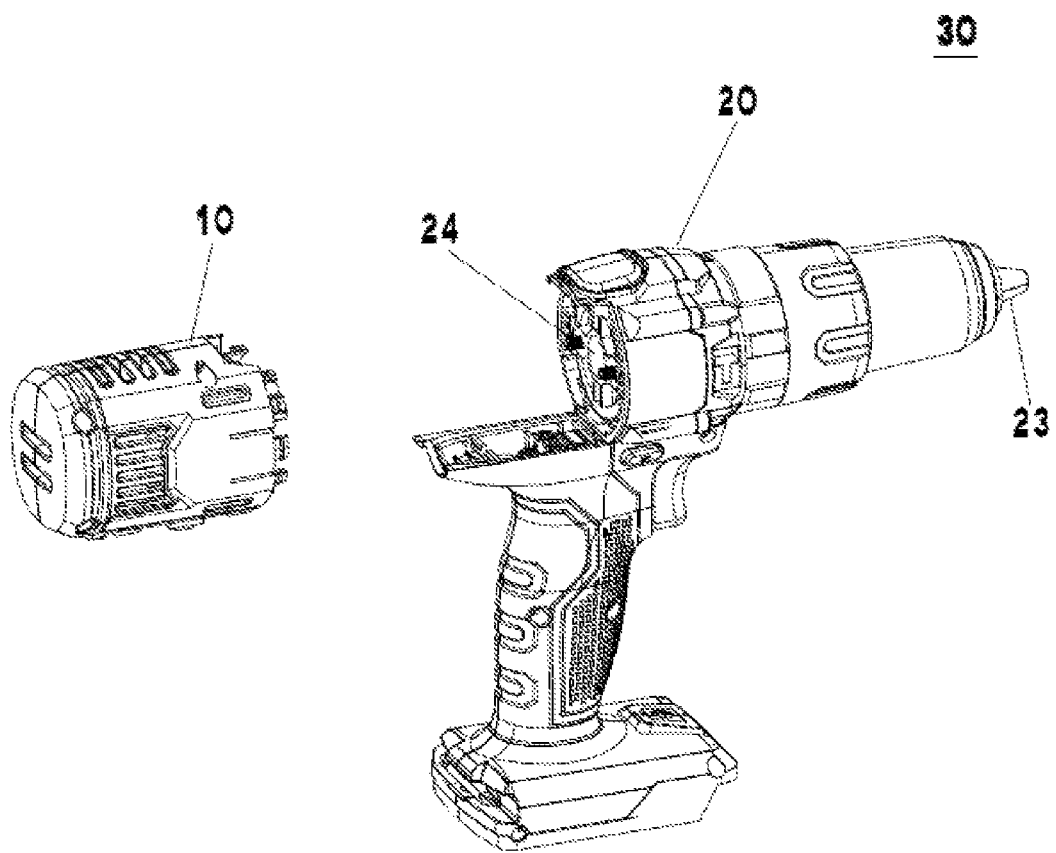
FIG. 2 is an exploded schematic diagram of the electric tool in FIG. 1.

In order to reduce the cost of electric tools and further promote such labor-saving and high-efficiency tools, a motor 10, an operating handle 20 and an electric tool 30 are provided. At first, referring to the schematic diagram of the electric tool 30 shown in FIG. 1, the electric tool 30 includes a motor 10 and an operating handle 20. The motor 10 and the operating handle 20 are detachably connected with each other. Therefore the motor 10 and the operating handle 20 can be detached and separated from each other and each of the both exists as an independent product. FIG. 2 further shows an exploded schematic diagram of the electric tool 30.

Figure 3:
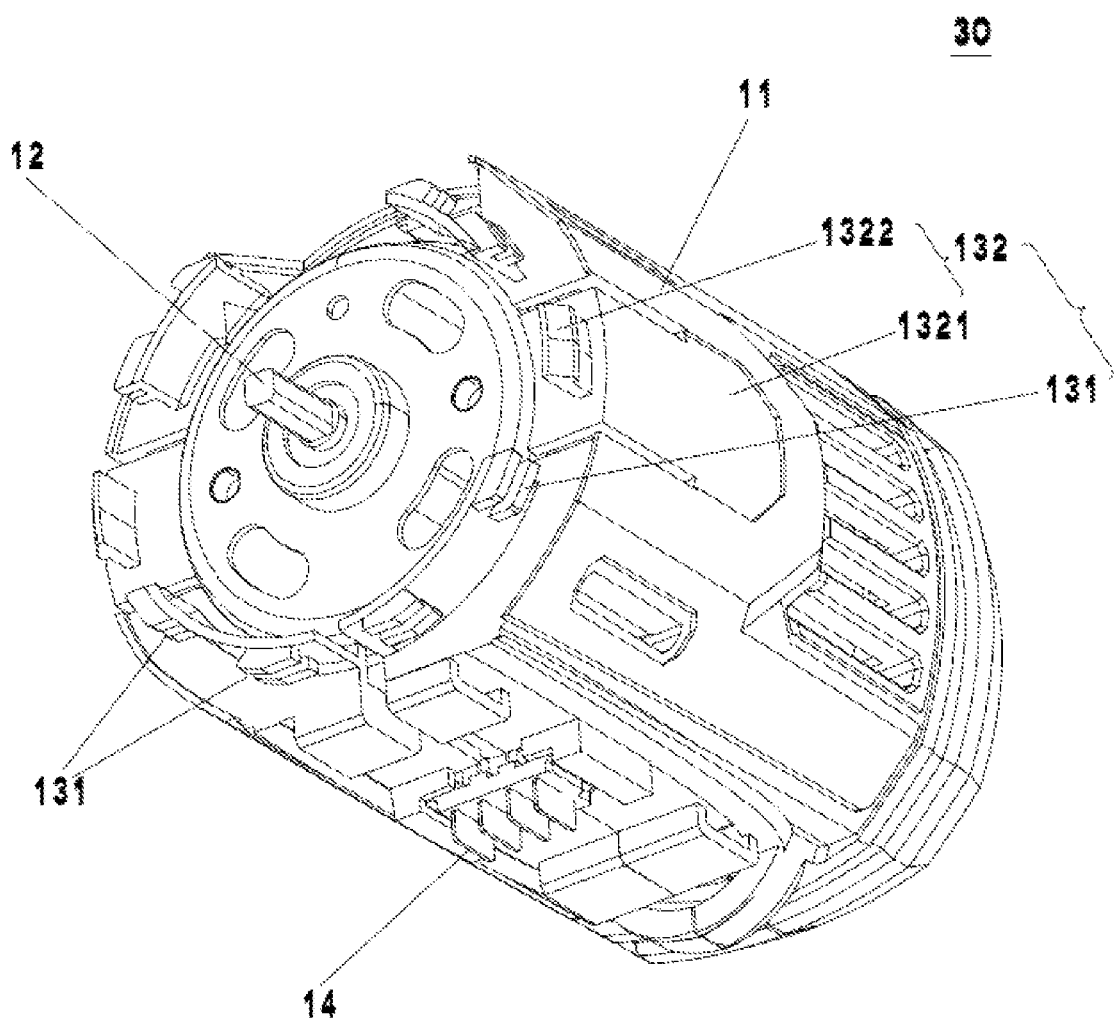
FIG. 3 is a schematic diagram of a motor according to an embodiment of the application.

Referring to FIG. 3, the motor 10 includes a motor body 11 and a motor shaft 12. Those skilled in the art should understand that the motor 10 is a device that converts electrical energy into mechanical energy. The motor body 11 includes a motor casing, a main magnetic pole, a commutating magnetic pole and other components in the motor casing. The first end of the motor shaft 12 of the motor 10 is connected to the inside of the motor body 11. The second end protrudes out of the motor body 11, can rotate by means of electric energy and drive external equipment to operate. There is no doubt that the cross section of the motor shaft 12 (that is, the cross section of the motor shaft 12 perpendicular to its axial direction) is not circular. In order to distinguish the cross section of the motor shaft 12 from the cross sections of other objects, the cross section of the motor shaft 12 is called the "first cross section" in this embodiment.

Figure 4:
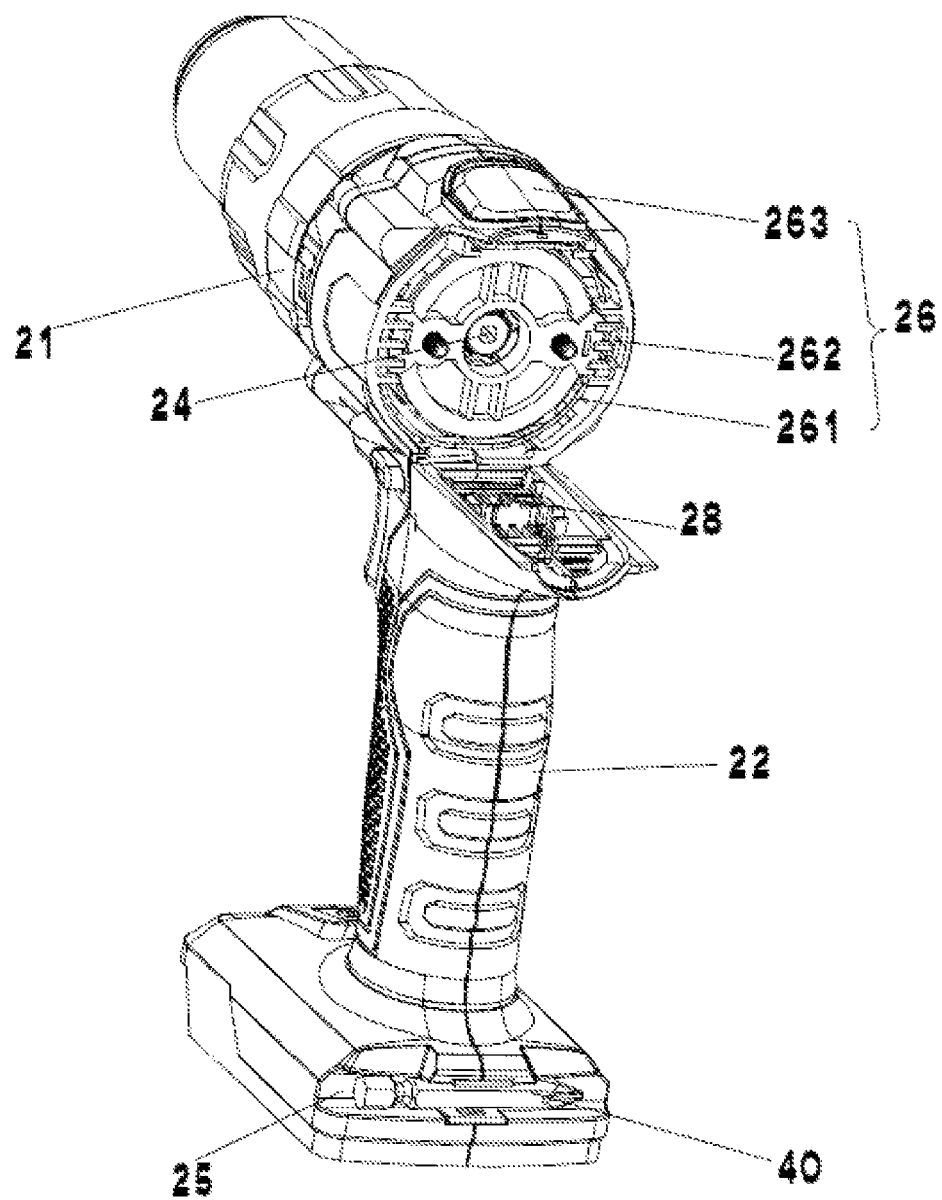
FIG. 4 is a schematic diagram of an operating handle according an embodiment of the application.

Correspondingly, the operating handle 20 adapted to the motor 10 is configured with an assembly hole for shaft 24 for fitting with the motor shaft 12. Referring to FIG. 4, the operating handle 20 includes a transmission gear box 21 and a holding handle 22. The holding handle 22 is fixedly connected to the transmission gear box 21. The transmission gear box 21 includes a gear box casing, gears and other components accommodated inside the gear box casing. It should be understood that although the holding handle 22 is fixedly connected to the side of the transmission gear box 21 in FIG. 4, such that the operating handle 20 is in a form of "gun", but in other examples of this embodiment, the operating handle 20 can also be in a form of "portable cannon", or the holding handle 22 may be connected to the end of the transmission gear box 21, for example, the rear end of the transmission gear box 21 will fit with the motor 10, additionally, an extension part will extends from the rear end against the extension direction of the motor shaft 12, particularly, the extension part extends to the tail end of the motor 10 to form a holding handle 22. In some examples, there is no strict boundary between the holding handle 22 of the operating handle 20 and the transmission gear box 21, in particular, apart of the transmission gearbox 21 is the holding handle 22.

Figure 5:
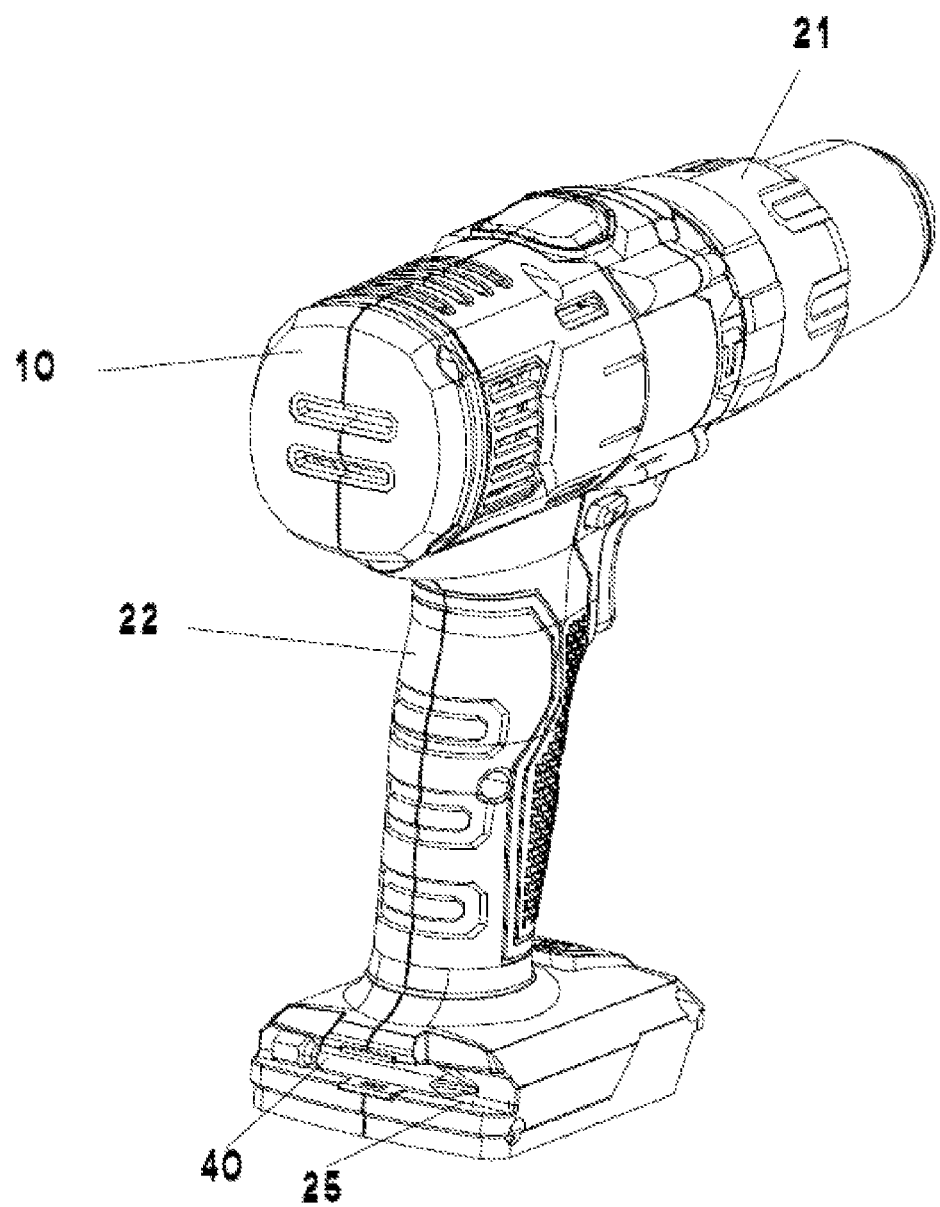
FIG. 5 is a schematic diagram of the electric tool according to the embodiment of the application from another perspective.
Figure 6:
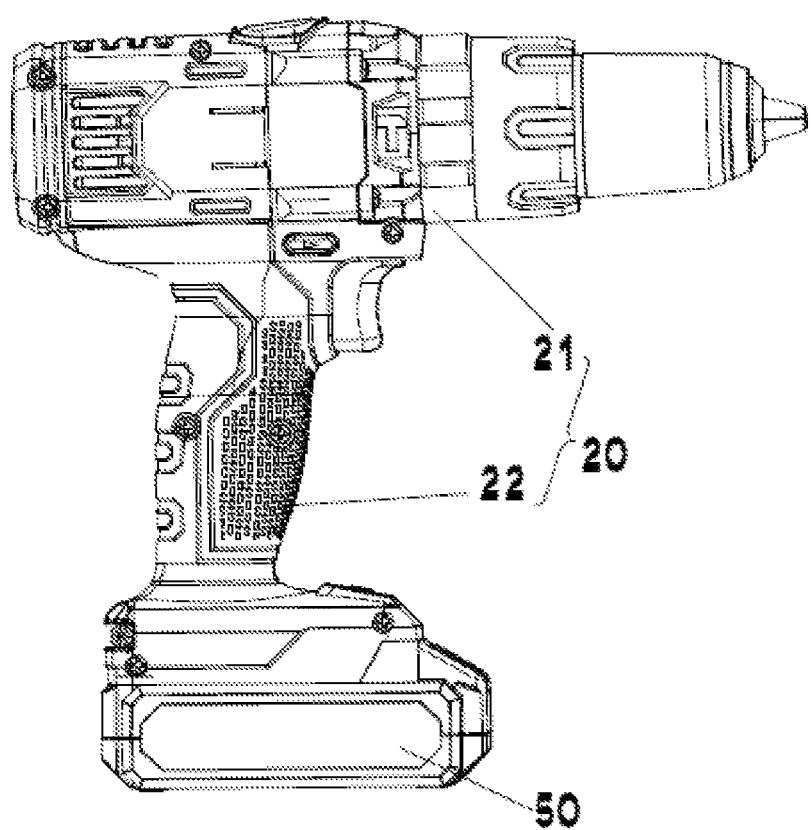
FIG. 6 is a schematic diagram of another electric tool according to an embodiment of the application from a perspective.

In this embodiment, the end of the transmission gear box 21 that fits with the operation head 40 (such as a drill bit, a hammer head, a mixing head, etc. of the electric tool) is regarded as the front end of the transmission gear box 21, and the end that fits with the motor 10 is regarded as the rear end. Therefore, in this embodiment, the front end of the transmission gear box 21 is provided with an operation head connector 23, which is configured to connect the operation head 40. Since the operation head 40 is the component of the electric tool 30 that directly contacts the object and wears quickly, the operation head 40 in the electric tool 30 is usually detachable and replaceable. Therefore, in some examples of this embodiment, the operating handle 20 may or may not be equipped with an operation head 40 when leaving the factory and selling. The operation head 40 can be or not be connected to the operation head connector 23 of the operating handle 20. For example, as shown in FIG. 5, the operating handle 20 is equipped with an operation head 40, however, the operation head 40 is not mounted on the operation head connector 23, but is accommodated in the accommodation cavity for operation head 25 of the operating handle 20. When the user needs to use the electric tool 30 to work, the corresponding operation head 40 can be taken out from the accommodation cavity for operation head 25 and installed on the operation head connector 23 of the operating handle 20. When the electric tool 30 needs to be stored, the operation head 40 can be removed from the operation head connector 23 and placed in the accommodation cavity for operation head 25, to prevent the sharp operation head 40 from damaging the storage box or bag, and also from stabbing or scratching the user. Those skilled in the art can understand that although in FIG. 5 the operation head 40 is fixed in the accommodation cavity by clamping, however, in other examples of this embodiment, the operation head 40 can be fixed in the accommodation cavity for operation head 25 in other ways, such as providing a cover that allows opening and closing at the opening of the cavity. In other application scenarios, an operation head 40 can be mounted on the operation head connector 23 while another operation head 40 can be placed in the accommodation cavity for operation head 25 as a backup.

An assembly hole for shaft 24 that fits with the motor shaft 12 is defined at the rear end of the transmission gear box 21. For the convenience of explanation, in this embodiment, the cross section of the assembly hole for shaft 24 (the cross section perpendicular to its depth direction) is called the "second cross section". The shape and the size of the second cross section are respectively adapted to the shape and the size of the first cross section. Those skilled in the art will understand that "adapted to" means that the assembly hole for shaft 24 can be inserted in by the motor shaft 12 for assembly. When the motor 10 is assembled, the motor shaft 12 can drive the gears in the transmission gear box 21 to rotate, and thus driving the operation head 40 to operate. Therefore, the shape and the size of the second cross section are respectively adapted to the shape and the size of the first cross section means that the shapes of the both are consistent and both are non-circular, but the size of the first cross section is slightly smaller than the size of the second cross section.

In some examples of this embodiment, both the first cross section and the second cross section are polygons, such as triangles, quadrilaterals, pentagons, etc. Those skilled in the art can understand that in other examples of this embodiment, the number of sides of the first cross section and the second cross section can be more, which will not be enumerated here. It should be understood that the more sides a polygon has, the closer it is to a circle, so the number of sides of the first cross section and the second cross section will not be too many in this embodiment. In some examples, the first cross section and the second cross section are quadrilateral, such as rectangle, square, trapezoid, ordinary parallelogram, and so on. In other examples, the first cross section and the second cross section may also be in a racetrack shape, a D-shape, etc. The D-shape herein refers to a shape whose outline is composed of a line segment and a curve connected end to end.

In some examples of this embodiment, the vertex angles of the first cross section and the second cross section are at least partially rounded, that is, the corners of the motor shaft 12 are not sharp corners. There is relatively smooth transition between adjacent sidewalls of the motor shaft 12. In some examples of this embodiment, each vertex angle of the first cross section and the second cross section is a rounded angle. Those skilled in the art can understand that compared with sharp angles, rounded corners will not be difficult to normally assemble due to bumping and deformation, which is beneficial to extending the service life of the motor 10, are also less likely to scratch other objects and are safer.

In some examples of this embodiment, the motor 10 is provided with a connection structure for handle 13 for fixed connection with the operating handle 20, and the operating handle 20 is provided with a connection structure for motor 26 for fixed connection with the motor 10. For example, in FIG. 3, the connection structure for handle 13 is provided on the motor body 11. The motor body 11 has a first assembly end that fits with the operating handle 20. The motor shaft 12 protrudes out from the end surface of this first assembly end. Continuing to refer to FIG. 4, the operating handle 20 has a second assembly end that fits with the motor 10. The connection structure for motor 26 is provided at the rear end of the transmission gear box 21, that is, the rear end of the transmission gear box 21 is the second assembly end of the operating handle 20. The connection structure for handle 13 includes a first connector at the first assembly end, and the connection structure for motor 26 includes a second connector at the second assembly end.

In some examples of this embodiment, one of the first connector or the second connector is an assembly boss, and the other of the first connector or the second connector is an assembly groove for fitting with the assembly boss. For example, in FIG. 3, the first connector is an assembly boss, and the second connector is an assembly groove. In other words, the assembly boss is located on the motor body 11, and the assembly groove is located on the transmission gear box 21. In this embodiment, the motor shaft 12 protrudes out from the assembly boss, and the assembly hole for shaft 24 is located at the bottom of the assembly groove.

A plurality of snap joints 131 are provided on the sidewall of the assembly boss. For example, in FIG. 3, a plurality of snap joints 131 are provided on the sidewall of the assembly boss, and an elastic snap ring 261 is arranged in the assembly groove around the inner sidewall of the assembly groove. A plurality of limit structures are provided on the inner sidewall of the assembly groove, so as to fix the elastic snap ring 261 on the inner sidewall of the assembly groove. In some examples of this embodiment, the elastic snap ring 261 can be an annular snap spring. The snap joint 131 is provided with a structure for limiting the elastic snap ring 261. When the motor is being assembled (that is, during the motor 10 is assembled to the operating handle 20), the assembly boss protrudes into the assembly groove, and the elastic snap ring 261 is hooped on the snap joints 131, so that a fixed connection between the motor 10 and the operating handle 20 is achieved through the fit of the elastic snap ring 261 with the snap joints 131. When the motor is being disassembled (that is, during the motor 10 is disassembled and separated from the operating handle 20), the elastic snap ring 261 is deformed under force, so that the snap joints 131 can be withdrawn through the deformation space, to be separated from the elastic snap ring 261. In some examples of this embodiment, the transmission gear box 21 is provided with a disassembly button 263. The disassembly button 263 is connected to the elastic snap ring 261. When the disassembly button 263 is pressed, it will transfer the pressure to the elastic snap ring 261, so that the elastic snap ring 261 is deformed under pressure. Therefore, when the motor 10 and the operating handle 20 need to be disassembled, the user can press the disassembly button 263 to apply pressure to the elastic snap ring 261.

Those skilled in the art can understand that, in other examples of this embodiment, the embodiments of the first connector and the second connector can be exchanged. For example, the assembly groove and the elastic snap ring 261 are provided at the first assembly end of the motor 10, while the assembly boss and the snap joint 131 are provided at the second assembly end of the operating handle 20.

In other examples of this embodiment, one of the first connector or the second connector is an adjustable buckle 132, and the other of the first connector or the second connector is a limit socket 262. For example, in FIG. 3, the first connector is an adjustable buckle 132, and in FIG. 4, the second connector is a limit socket 262. In other words, the adjustable buckle 132 is located at the motor body 11, and the limit socket 262 is located at the transmission gear box 21. The adjustable buckle 132 includes a body slab 1321 and a stopper of buckle 1322. The stopper of buckle 1322 is provided at the body slab 1321. In this embodiment, the body slab 1321 is a sheet with deformability. For example, in FIG. 3, the body slab 1321 will constitute a part of the casing of the motor body 11, so the body slab 1321 is curved. A part of the edges of the body slab 1321 is fixedly connected to the body of the casing of the motor body 11, and another part of the edges of the body slab 1321 are suspended "free edges" that are not fixedly connected to the body of the casing. In this way, when the body slab 1321 is under pressure, it has a deformation space to be able to drive the stopper of buckle 1322 to move. When the motor is being assembled, the stopper of buckle 1322 protrudes into the limit socket 262 and is fastened with the limit socket 262. Through the fit of the stopper of buckle 1322 and the limit socket 262, a fixed connection between the motor 10 and the operating handle 20 can be realized. When the motor is being disassembled, the body slab 1321 is deformed under force, so as to drive the stopper of buckle 1322 to move out of the limit socket 262, so that the motor 10 can be separated from the operating handle 20. In this embodiment, because the body slab 1321 is directly exposed, it is only necessary for the user to press the surface of the body slab 1321 when it is necessary to apply force to the body slab 1321. In other examples, if the body slab 1321 is hidden inside the casing of the motor body 11, it may also be necessary to provide exposed buttons to facilitate applying force to the body slab 1321 by pressing the buttons.

Those skilled in the art can understand that in other examples, the positions of the adjustable buckle 132 and the limit socket 262 can be exchanged. That is, the adjustable buckle 132 is provided at the operating handle 20 and the limit socket 262 is provided at the motor 10. In addition, although in FIG. 3 the first connector only includes one adjustable buckle 132 and the second connector only includes one limit socket 262, however in other examples of this embodiment, more than one limit sockets 262 and adjustable buckles 132 can also be provided.

In addition, although the first connector at the motor 10 in FIG. 3 and FIG. 4 includes both the snap joints 131 and the adjustable buckle 132, while the second connector at the operating handle 20 includes both the elastic snap ring 261 and the limit socket 262, but in other examples of this embodiment, the first connector may only include one of the snap joints 131 or the adjustable buckle 132 but not the other; the second connector may only include one of the elastic snap ring 261 or the limit socket 262 but not the other. Those skilled in the art can understand that in other examples of this embodiment, the first connector and the second connector can also fit through other connection manners, which will not be specially defined here.

In the above example, the motor 10 is engaged with the second assembly end of the operating handle 20 through its first assembly end, besides that, the motor has a third assembly end that is engaged with the fourth assembly end of the operating handle 20. Continuing to refer to FIG. 3 and FIG. 4, assuming that the first assembly end of the motor 10 provided with the motor shaft 12 is its front end, then the end of the bottom of the motor 10 is its third assembly end. The end surface of the first assembly end is adjacent to the end surface of the third assembly end. In the above example, the end surfaces of the both are approximately perpendicular to each other. Correspondingly, the end surface of the second assembly end at the operating handle 20 is also adjacent to and perpendicular to the end surface of the fourth assembly end at the operating handle. In some other examples, the end surface of the first assembly end can be non-perpendicular to the end surface of the third assembly end. Similarly, the end surface of the second assembly end can be non-perpendicular to the end surface of the fourth assembly end.

In other examples of this embodiment, the motor 10 is engaged with the second assembly end of the operating handle 20 only through its first assembly end. In some other examples, motor 10 can be engaged with the operating handle 20 through more assembly ends. For example, the motor 10 has three assembly ends, four assembly ends, or even five assembly ends.

There is no doubt that the operation of the motor 10 requires electric energy. Therefore, when the motor 10 is mounted on the operating handle 20 and works, it must be electrically connected to a power source. Therefore, the motor body 11 of the motor 10 is further provided with a connection structure for power receiving 14, as shown in FIG. 3. In some examples of this embodiment, the power source can be directly and electrically connected to the motor 10, that is, the electrical connection may not be realized through the operating handle 20. For example, the power source can be a battery, and the output end of this battery is electrically connected to the connection structure for power receiving 14 of the motor 10. In one example, the battery can be directly and fixedly connected to the tail end of the motor body 11 or to the sidewall of the motor body 11, thereby achieving an electrical connection with the connection structure for power receiving 14 at the motor 10, while achieving a fixed connection with the motor body 11. In other examples, the power source may be commercial power. In this case, the connection structure for power receiving 14 at the motor body 11 may be a plug connected to the motor body 11.

In other examples of this embodiment, the electrical connection between the power supply and the motor 10 needs to be realized through the operating handle 20. In this case, the operating handle 20 is provided with a connection structure for power supply 28 for fitting with the connection structure for power receiving 14 at the motor 10, and is further provided with a connection structure for feed (not shown) for fitting with the output end of the power supply. The position of the connection structure for power receiving 14 at the motor 10 corresponds to the position of the connection structure for power supply 28 at the operating handle 20. When the assembly of the motor 10 is completed, the connection structure for power receiving 14 contacts the connection structure for power supply 28 to achieve an electrical connection. The connection structure for power supply 28 at the operating handle 20 is electrically connected to the connection structure for feed. Usually there are wires connected between the both. The connection structure for feed is configured to be electrically connected to the output end of the power source. The power source here can also be a battery or commercial power. If the power source is commercial power, the connection structure for feed can be a plug. If the power supply is a battery, the connection structure for feed can be contacts or electrical connection plates connected to the positive or negative pole of the battery, respectively.

In some examples of this embodiment, the power source described above is a battery assembly 50, and the battery assembly 50 is usually a combination of at least two batteries. In some examples, the battery assembly 50 can be integrated with the motor 10 or the operating handle 20. For example, if the battery assembly 50 is integrated with the motor 10, they cannot be detached from each other. If the battery assembly 50 is integrated with the operating handle 20, the operating handle 20 and the battery assembly 50 also belong to an inseparable whole. In other examples of this embodiment, the battery assembly 50 is also detachably mounted in the electric tool 30. The user can purchase the battery assembly 50 separately and install it for use. The same battery assembly 50 can also power different devices and different electric tools 30.

Figure 7:
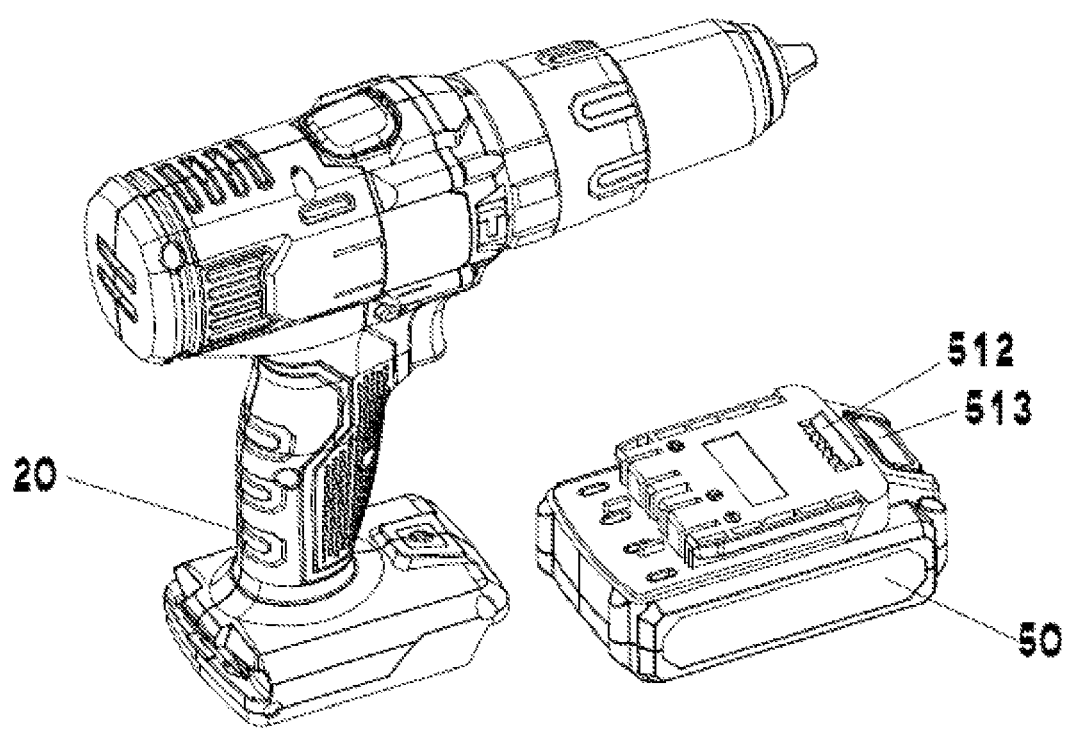
FIG. 7 is an exploded schematic diagram of the electric tool in FIG. 6.
Figure 8:
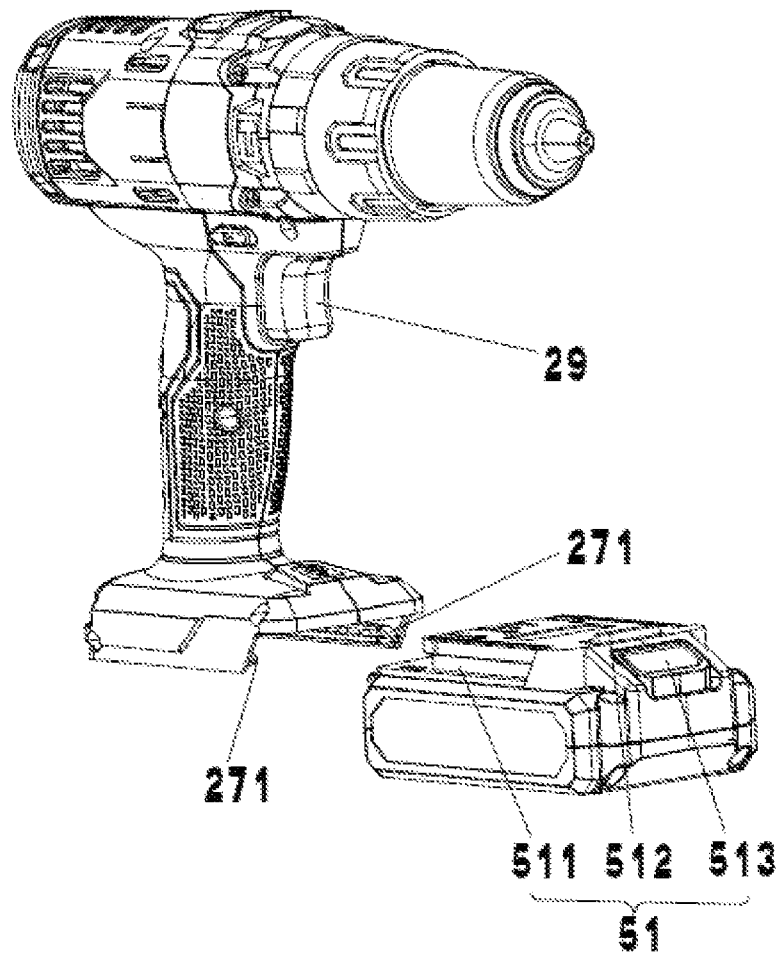
FIG. 8 is another exploded schematic diagram of the electric tool in FIG. 6.
Figure 9:
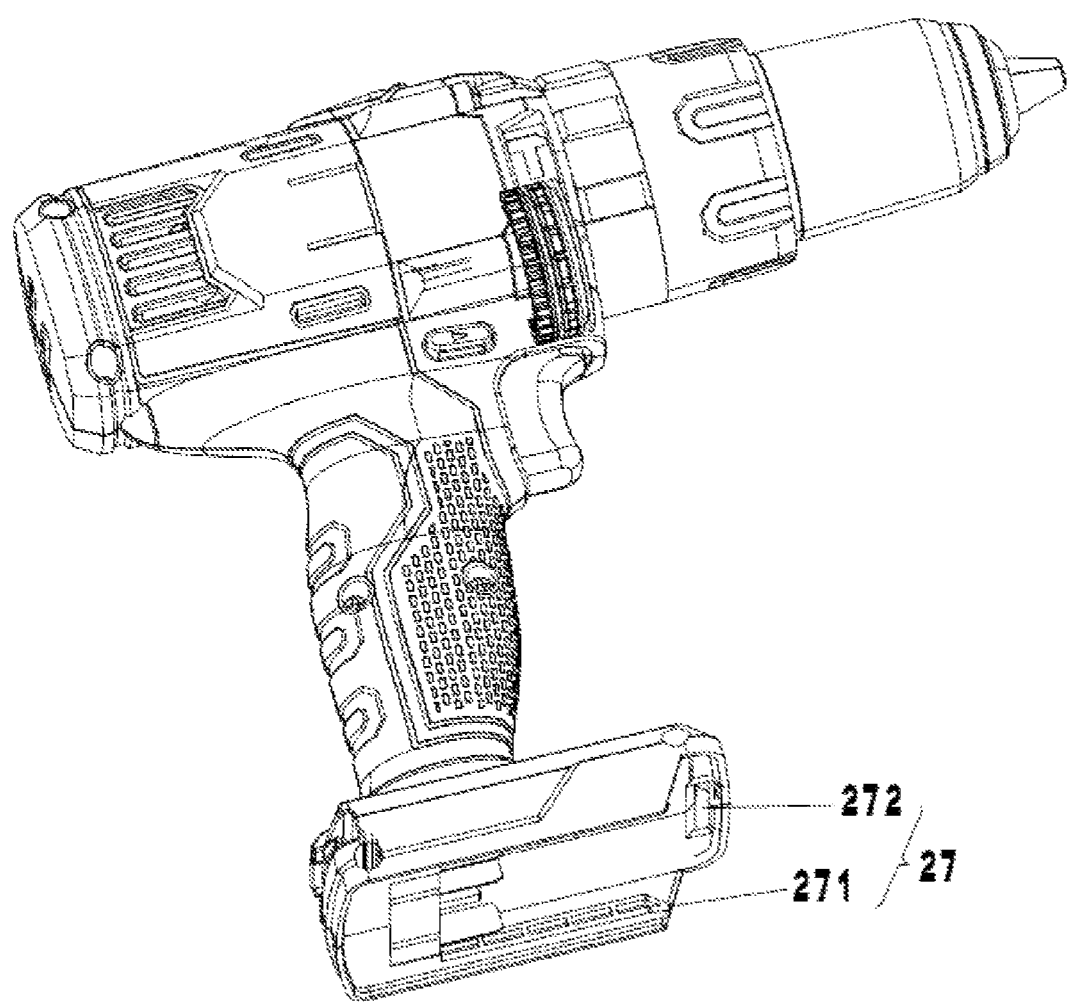
FIG. 9 is another schematic diagram of the operating handle according to an embodiment of the application.

For example, referring to FIG. 6 to FIG. 9, FIG. 6 shows another electric tool 30. FIG. 7 and FIG. 8 are both exploded schematic diagrams of the electric tool 30 in FIG. 6. The battery assembly 50 is disposed at an end of the holding handle 22 away from the transmission gear box 21. FIG. 9 shows the matching structure at the operating handle 20 matched with the battery assembly 50. Undoubtedly, in other examples of this embodiment, the battery assembly 50 may also be arranged at other positions on the operating handle 20.

Referring to FIG. 8 and FIG. 9, the operating handle 20 is further provided with a battery fixing structure 27 for fixing the battery assembly 50, and the battery assembly 50 is provided with a handle fixing structure 51 for fitting with the battery fixing structure 27. Through the fit between the handle fixing structure 51 and the battery fixing structure 27, the detachable assembly of the battery assembly 50 on the operating handle 20 can be realized. In FIG. 8 and FIG. 9, the battery fixing structure 27 is arranged at the bottom of the holding handle 22 away from the transmission gear box 21.

Generally, the battery assembly 50 is substantially cuboid. The cuboid battery assembly 50 can fit with the holding handle 22 through its top surface and at least two side surfaces (for ease of explanation, the top surface of the battery assembly 50 for fitting with the holding handle 22 is called the assembly top surface, and the side surface for fitting with the holding handle 22 is called the assembly side surface). In this case, the bottom of the holding handle 22 can form a semi-enclosed structure around the battery assembly 50. The bottom of the holding handle 22 has an assembly top wall for fitting with the assembly top surface and an assembly inner sidewall for fitting with the assembly side surface. The output end of the battery assembly 50 can be disposed on at least one of the assembly top surface and the assembly side surface. The connection structure for feed at the operating handle 20 can be disposed on at least one of the assembly top wall and the assembly inner sidewall. The handle fixing structure 51 of the battery assembly 50 can be disposed on at least one of the assembly top surface or the assembly side surface. The battery fixing structure 27 of the operating handle 20 can be disposed on at least one of the assembly top wall and the assembly inner sidewall. In FIG. 7 and FIG. 8, the output end of the battery assembly 50 is located at its assembly top surface, the handle fixing structure 51 is configured on two opposite assembly side surfaces. Correspondingly, the connection structure for feed of the operating handle 20 is configured at its assembly top wall, while the battery fixing structure 27 is configured at two opposite assembly inner sidewalls.

In some examples of this embodiment, one of the battery fixing structure 27 or the handle fixing structure 51 includes a coulisse 511, and the other thereof includes a convex slider 271 for engaging with the coulisse 511. For example, in FIG. 7 to FIG. 9, the coulisse 511 is defined in the battery assembly 50, and the convex slider 271 is configured at the operating handle 20. However, in other examples of this embodiment, the positions of the coulisse 511 and the convex slider 271 can be exchanged. In some other examples, the battery fixing structure 27 includes a first coulisse and a second convex slider, and the handle fixing structure 51 includes a first convex slider for engaging with the first coulisse and a second coulisse for engaging with the second convex slider, in this case, both the battery fixing structure 27 and the handle fixing structure 51 include the coulisse 511 and the convex slider 271.

The end surface of at least one end of the coulisse 511 is open. It is assumed that two ends of the coulisse 511 are the first end and the second end respectively, and the end face of the first end is open. In addition to the opening of the end surface, the coulisse 511 also has a long notch. In some examples of this embodiment, the bottom of the holding handle 22 is configured with an accommodation space for accommodating the battery assembly 50. The accommodation space has at least two opposite sidewalls. Each of the two opposite sidewalls is provided with a convex slider 271 on the inside. Each of the two opposite assembly side surfaces of the battery assembly 50 is provided with a coulisse 511. Therefore, through the fit of the coulisses 511 and the convex sliders 271, the battery assembly 50 can be limited relative to the operating handle 20 not only in the direction perpendicular to the assembly top surface of the battery assembly 50, but also partly in the direction parallel to the assembly top surface. However, in other directions parallel to the assembly top surface, there is still space for relative movement between the battery assembly 50 and the operating handle 20, and the vibration generated during use of the electric tool 30 will aggravate this relative movement, which causes the battery assembly 50 to be undesirably detached from the operating handle 20.

In order to prevent the battery assembly 50 from undesirable detaching from the operating handle 20 described above, in some examples of this embodiment, the battery fixing structure 27 and the handle fixing structure 51 can fit with each other through other connecting component besides the convex slider 271 and the coulisse 511. For example, in some examples, one of the battery fixing structure 27 or the handle fixing structure 51 further includes an elastic plug 512, and the other thereof further includes a socket 272 for fitting with the elastic plug 512. As shown in the corresponding example of FIG. 8, the handle fixing structure 51 includes an elastic plug 512. The battery fixing structure 27 includes a socket 272, in particular, the elastic plug 512 is disposed on the assembly top surface of the battery assembly 50, while the socket 272 for fitting with this elastic plug 512 is defined in the assembly top wall of the holding handle 22. The elastic plug 512 will retract toward the inside of the battery assembly 50 under pressure, and will pop up again when the pressure is removed. Therefore, when the battery is in the assembled state, the elastic plug 512 is at first retracted due to the pressure from the bottom surface of the holding handle 22. After the battery assembly 50 and the operating handle 20 are assembled in place, the position of the elastic plug 512 will correspond to the position of the socket 272. Accordingly, when the pressure on it is removed, the elastic plug 512 can pop up again and protrude into the socket 272, so as to limit the battery assembly 50 relative to the operating handle 20 in the direction parallel to the top surface of the battery assembly 50. In addition, a separation button 513 connected to the elastic plug 512 is exposed outside the battery assembly 50. When the battery assembly 50 needs to be disassembled, the user can press the separation button 513 to apply pressure on the elastic plug 512, so that the elastic plug 512 retracts, and at the same time apply a pulling force on the battery assembly 50 and the operating handle 20 in opposite directions, so that the convex slider 271 at the operating handle 20 slides out from the end surface of the coulisse 511.

Those skilled in the art can understand that the cuboid battery assembly 50 can also fit with the bottom surface of the holding handle 22 only through its top surface. In this case, both the output end of the battery assembly 50 and the handle fixing structure 51 can be provided on its top surface, while the connection structure for feed at the operating handle 20 and the battery fixing structure 27 can be provided on the bottom surface of the holding handle 22.

Figure 10:
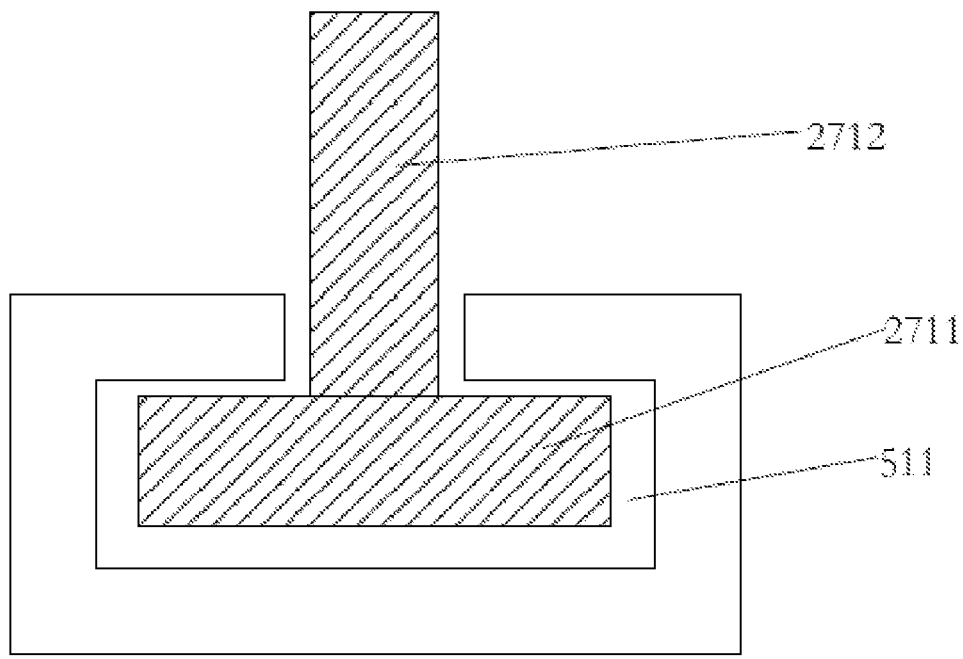
FIG. 10 is a schematic diagram showing the fit between the convex slider and the coulisse according to an embodiment of the application.

In these examples, the coulisse 511 and the convex slider 271 can have a more special structure. For example, in the direction parallel to the slot and perpendicular to the extending direction of the coulisse 511 (i.e. the width direction), the size of the inner space of the coulisse 511 is larger than the size of the slot, that is, the inner width of the coulisse 511 is larger than the width of the slot. One side of the convex slider 271 is fixed to the bottom of the holding handle 22, which is the fixed side, while the other side is suspended in the air, which is the suspended side. For ease of explanation, the convex slider 271 is divided into an embedding head 2711 and a connection neck 2712 along the direction from the fixed side to the suspended side. The connection neck 2712 is thinner than the embedding head 2711. When the battery is being assembled (that is, during the process of assembling the battery), the convex slider 271 slides in the coulisse 511 from the end surface of the first end thereof, while the embedding head 2711 is embedded in the coulisse 511 and slides along the coulisse 511 to the second end thereof. Referring to FIG. 10, FIG. 10 shows a schematic cross sectional view of the matching structure of the coulisse 511 and the convex slider 271. Since the width of the coulisse 511 is smaller than the size of the embedding head 2711 in the same direction, the embedding head 2711 cannot come out from the slot, so that a fixed fit between the battery assembly 50 and the operating handle 20 can be achieved. When the battery is being disassembled (that is, during the process of disassembling the battery assembly 50 and the operating handle 20), the convex slider 271 slides out from the end surface of one end of the coulisse 511, so as to realize the separation of the battery assembly 50 and the operating handle 20. In some examples of this embodiment, in order to prevent the convex slider 271 from directly sliding out from the second end of the coulisse 511 after sliding in through the first end thereof, a limit structure can be provided at the second end of the coulisse 511. For example, the end surface of the second end is sealed, and/or a blocking structure is provided at the end of the convex slider 271 opposite to the first end, so that the convex slider 271 can only slide in through the first end of the coulisse 511 and can only slide out from the first end.

In the same way, in order to prevent the battery assembly 50 from moving relative to the operating handle 20 in a direction parallel to the assembly top surface of the battery assembly 50 during normal use of the electric tool 30, which causes an undesirable separating of the battery assembly 50 from the operating handle 20, an elastic plug 512 and a socket 272 and other structures may also be provided in this example.

Figure 11:
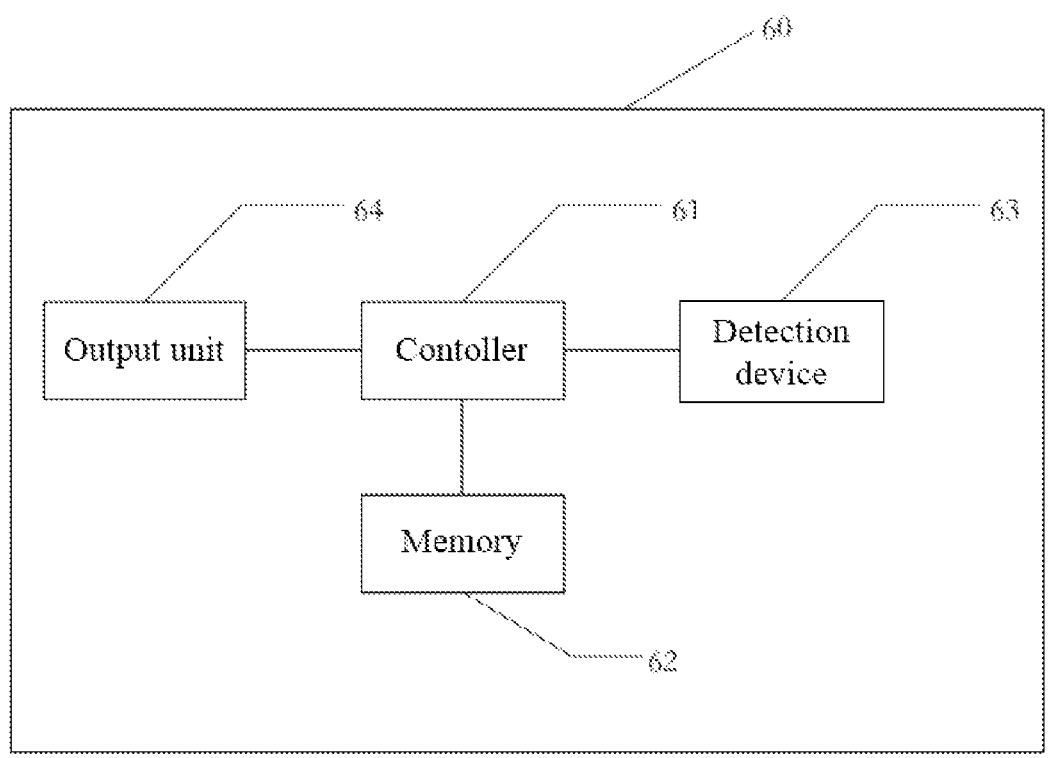
FIG. 11 is a schematic diagram of a hardware structure of the identification assembly in the electric tool according to the embodiment of the application.

In some examples of this embodiment, the electric tool 30 may also include an identification assembly 60. Referring to FIG. 11, the identification assembly 60 includes a controller 61, a memory 62, a detection device 63 and an output unit 64. The controller 61 is in communication with the memory 62, the detection device 63 and the output unit 64 respectively.

Figure 12:
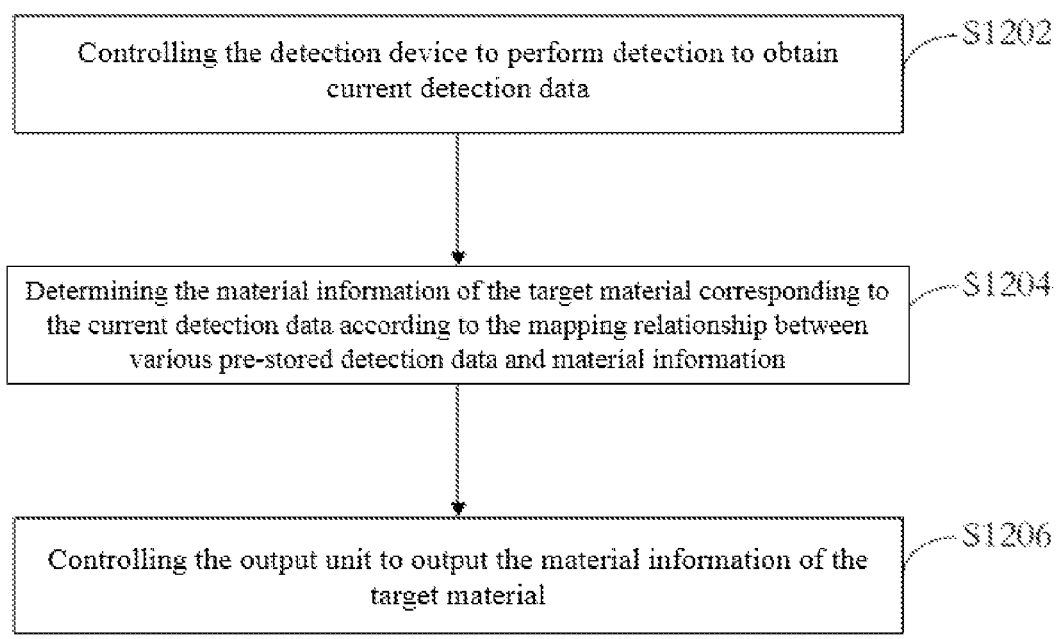
FIG. 12 is a schematic flow chart of the material identification method according to an embodiment of the application.

In particular, the detection device 63 may include at least one of a camera 631 or an acoustic wave detector 632. In the identification assembly 60 shown in FIG. 11, the detection device 63 includes both a camera and an acoustic wave detector. In particular, the camera is configured for image collection, and the acoustic wave detector is also called an acoustic instrument, an acoustic detector, etc., which includes an acoustic wave emitter and an acoustic wave receiver. The acoustic wave emitter is configure to emit acoustic waves, and the acoustic wave receiver is configured to receive the reflected acoustic waves and record the reception time and intensity etc. of reflected acoustic waves. The acoustic waves emitted by the acoustic wave emitter can be ultrasonic waves or infrasonic waves. The output unit 64 includes at least one of a display screen or an audio output unit. The memory 62 can be configured to store instructions, programs, codes, code sets, or instruction sets. The memory 62 may include a program storage area and a data storage area. In particular, the program storage area may be configured to store an identification program for material that can be read, compiled and implemented by the controller 61 to achieve a material identification method. The data storage area may be configured to store the data involved in the material identification method, such as a variety of mapping relationships between the detection data and the material information. For example, a mapping relationship table of detection data and material information is stored in the data storage area of the memory 62, which mapping relationship reflects the correspondence between material information and detection data ranges. A material identification method based on the identification assembly 60 provided in FIG. 11 is provided, referring to FIG. 12:

S1202: Controlling the detection device to perform detection, to obtain current detection data.

The controller 61 controls the detection device 63 to perform detection, to obtain current detection data. For example, the camera is controlled to collect image data, the acoustic wave detector is controlled to perform acoustic wave detection to obtain acoustic wave detection data.

S1204: Determining material information of a target material corresponding to the current detection data according to the mapping relationship between various pre-stored detection data and material information.

The controller 61 queries the mapping relationship stored in the memory 62 according to the current detection data, to determine the material information corresponding to the current detection data as the material information of the target material. In this embodiment, the material information includes at least one of material, hardness, or humidity, etc. In one example, the controller 61 can determine the material, hardness and humidity of the target material according to the current detection data.

S1206: Controlling the output unit to output the material information of the target material.

After determining the material information of the target material, the controller 61 controls the output unit 64 to output the material detection result. If the output unit includes a display screen, the controller 61 can control the display screen to display the material information of the target material. In some other examples of this embodiment, the output unit 64 may include an audio output unit. In this case, the controller 61 may control the audio output unit, such as a speaker, to broadcast the material information of the target material by voice. In some examples, the output unit 64 includes both a display screen and an audio output unit. The user can set how to output the detection results, or the detection results can be output in two ways respectively, such as displaying and simultaneously performing voice broadcast.

In some examples of this embodiment, the identification assembly 60 can be arranged at the motor 10 of the electric tool 30 or at its operating handle 20. In some examples, it can be arranged at the front end of the operating handle 20, that is, the end of the operating handle 20 that fits with the operation head. In particular, the camera and the acoustic wave detector in the detection device 63 are at least partially exposed. The display surface of the display screen in the output unit 64 is exposed, while the controller 61 and the memory 62 can be arranged inside the operating handle 20.

In order to control the start, stop, working mode, etc. of the electric tool 30, the electric tool 30 has a control mainboard. The control mainboard is provided with a processor, a storage device in communication with the processor, and so on. A control program for working mode etc. is stored in the storage device. A processor may include one or more processing cores. The processor runs or executes the instructions, the programs, the code sets or the instruction sets stored in the memory, so as to call the data stored in the memory, to perform various functions of the application and process data. The processor can be at least one of an Application Specific Integrated Circuit (ASIC), a Digital Signal Processor (DSP), a Digital Signal Processing Device (DSPD), or a Programmable Logic Device (PLD), Field Programmable Gate Array (FPGA), Central Processing Unit (CPU), a controller, a microcontroller or a microprocessor. It can be understood that for different devices, the electronic device used to implement the above processor function may also be others, which is not specifically defined in the embodiment of the application. The processor can read, compile and execute the working mode control program, thereby controlling the motor 10 to drive the operation head 40 to work according to the corresponding working mode. In some examples of this embodiment, the controller 61 of the identification assembly 60 may be independent of the processor on the control mainboard. In other examples, the controller 61 may also be integrated with the processor on the control mainboard. Similarly, the memory 62 of the identification assembly 60 can be independent of the memory device on the control mainboard, or can be integrated into a whole. In this embodiment, the operating handle 20 of the electric tool 30 is further provided with a control switch 29. The control switch 29 can be located at the holding handle 22 or at the transmission gear box 21. It can be understood that the control switch 29 is electrically connected to the control mainboard. The user can start the electric tool 30 to work through the control switch, or control the working electric tool 30 to stop working.

A computer readable storage medium is further disclosed, including various media that can store program codes, such as a USB stick, a mobile hard disk, a Read Only Memory (ROM), a Random Access Memory (RAM), a magnetic disk or a CD, and so on. A computer program that can be loaded by the processor and execute the material identification method of the above embodiment is stored in the computer readable storage medium.

As mentioned above, the above embodiments are only used to introduce the implementations of the application in detail. However, the descriptions of the above embodiments are only used to help to understand the methods and core ideas of the application and should not be understood as limitations of the application. Changes or substitutions, which can be easily obtained by the skilled in the art within the technical scope disclosed in the application, should all be covered by the protection scope of the application.

LIST OF REFERENCE SIGNS

10 motor
11 motor body
12 motor shaft
13 connection structure for handle
131 snap joint
132 adjustable buckle
1321 body slab
1322 stopper of buckle
14 connection structure for power receiving
20 operating handle
21 transmission gear box
22 holding handle
23 operation head connector
24 assembly hole for shaft
25 accommodation cavity for operation head
26 connection structure for motor
261 elastic snap ring
262 limit socket
263 disassembly button
27 battery fixing structure
271 convex slider
2711 embedding head
2712 connection neck
272 socket
28 connection structure for power supply
29 control switch
30 electric tool
40 operation head
50 battery assembly
51 handle fixing structure
511 coulisse
512 elastic plug
513 separation button
60 identification assembly
61 controller
62 memory
63 detection device
64 output unit

What is claimed is:

1. A motor, comprising a motor body and a motor shaft with a first end connected to an inside of the motor body and a second end protruding out of the motor body, wherein a first cross section of the motor shaft perpendicular to an axial direction of the motor shaft is non-circular, a shape and a size of a second cross section of an assembly hole for shaft in an operating handle are matched with a shape and a size of the first cross section, the second cross section is perpendicular to a depth direction of the assembly hole for shaft, and the assembly hole for shaft allows the motor shaft to extend into a transmission gear box of the operating handle for assembly, the motor body is provided with a connection structure for handle, and the connection structure for handle is configured to fit with a connection structure for motor at the operating handle to realize a detachable assembly of the motor on the operating handle, the motor body comprises a first assembly end, the motor shaft protrudes out from an end surface of the first assembly end, the first assembly end is configured to fit with a second assembly end of the operating handle, and an orifice of the assembly hole for shaft is defined on an end surface of the second assembly end, and the connection structure for handle comprises a first connector at the first assembly end, the first connector is configured to fit with a second connector in the connection structure for motor, the second connector is arranged at the second assembly end, and the first connector fits with the second connector by at least one of following ways:

one of the first connector or the second connector comprises an assembly boss, the other of the first connector or the second connector comprises an assembly groove for fitting with the assembly boss, a plurality of snap joints are provided on a sidewall of the assembly boss, an elastic snap ring is arranged around the assembly groove in an inner sidewall of the assembly groove, wherein when the motor is being assembled, the assembly boss protrudes into the assembly groove, the elastic snap ring is hooped on the plurality of snap joints, and when the motor is being disassembled, the elastic snap ring is deformed under force, so that the plurality of snap joints are configured to be withdrawn and separated from the elastic snap ring, or one of the first connector or the second connector comprises an adjustable buckle, the other of the first connector or the second connector comprises a limit socket, the adjustable buckle comprises a body slab and a stopper of buckle fixed on the body slab, wherein when the motor is being assembled, the stopper of buckle is configured to protrude into the limit socket and is engaged with the limit socket, and when the motor is being disassembled, the body slab is deformed under force, so as to bring the stopper of buckle to move out of the limit socket.

2. The motor according to claim 1, wherein the first cross section meets at least one of following conditions:
the first cross section is a polygon;
the first cross section is either a quadrilateral or a D-shape, and an outline of the D-shape is formed by a line segment and a curve connected end to end; or
at least part of vertex angles of the first cross section are rounded.

3. The motor according to claim 1, wherein the motor body is further provided with a connection structure for power receiving, the connection structure for power receiving is configured to be electrically connected to a connection structure for power supply at the operating handle after the motor is assembled, so as to supply power to the motor through the operating handle.

4. An operating handle for an electric tool, comprising a transmission gear box and a holding handle, wherein the holding handle is fixedly connected to the transmission gear box,
an end of the transmission gear box that fits with an operation head of the electric tool is a front end, an end of the transmission gear box that fits with a motor is a rear end, the front end is provided with an operation head connector, the operation head connector is configured to connect the operation head, the rear end is configured with an assembly hole for shaft for fitting with a motor shaft of the motor, a second cross section of the assembly hole for shaft is non-circular, a shape and a size of the second cross section are matched with a shape and a size of a first cross section of the motor shaft, respectively, the first cross section is perpendicular to an axial direction of the motor shaft, the second cross section is perpendicular to a depth direction of the assembly hole for shaft, and the assembly hole for shaft allows the motor shaft to extend into the transmission gear box for assembly, and the rear end is further provided with a connection structure for motor, and the connection structure for motor is configured to fit with a connection structure for handle at the motor to realize a detachable assembly of the motor on the operating handle.

5. The operating handle for an electric tool according to claim 4, wherein the rear end is a second assembly end of the operating handle, and the second assembly end is configured to fit with a first assembly end of the motor, the connection structure for motor comprises a second connector at the second assembly end, the second connector is configured to fit with a first connector in the connection structure for handle, the first connector is arranged at the first assembly end, and the first connector fits with the second connector by at least one of following ways:

one of the first connector or the second connector comprises an assembly boss, the other of the first connector or the second connector comprises an assembly groove for fitting with the assembly boss, a plurality of snap joints are provided on a sidewall of the assembly boss, an elastic snap ring is provided around the assembly groove in an inner sidewall of the assembly groove, wherein when the motor is being assembled, the assembly boss protrudes into the assembly groove, the elastic snap ring is hooped on the plurality of snap joints, and when the motor is being disassembled, the elastic snap ring is deformed under force, so that the plurality of snap joints are configured to be withdrawn and separated from the elastic snap ring, or one of the first connector or the second connector comprises an adjustable buckle, the other of the first connector or the second connector comprises a limit socket, the adjustable buckle comprises a body slab and a stopper of buckle fixed on the body slab, wherein when the motor is assembled, the stopper of buckle is configured to protrude into the limit socket and is engaged with the limit socket, and when the motor is being disassembled, the body slab is deformed under force, so as to bring the stopper of buckle to move out of the limit socket.

6. The operating handle for an electric tool according to claim 4, wherein the operating handle is further provided with a connection structure for feed and a connection structure for power supply electrically connected to the connection structure for feed, the connection structure for feed is configured to be electrically connected to an output end of a power source, and the connection structure for power supply is configured to be electrically connected to a connection structure for power receiving at the motor after the motor is assembled, so as to supply power to the motor.

7. The operating handle for an electric tool according to claim 6, wherein the operating handle is further provided with a battery fixing structure, the battery fixing structure is configured to fit with a handle fixing structure at a battery assembly to realize a detachable assembly of the battery assembly on the operating handle, and the connection structure for feed is configured to be electrically connected to an output end of the battery assembly after the battery assembly is assembled, and one of the battery fixing structure or the handle fixing structure comprises a coulisse, the other of the battery fixing structure or the handle fixing structure comprises a convex slider for fitting with the coulisse, one of the battery fixing structure or the handle fixing structure further comprises an elastic plug, the other of the battery fixing structure or the handle fixing structure further comprises a socket for fitting with the elastic plug, wherein when a battery is being assembled, the convex slider slides into the coulisse through an end face of a first end of the coulisse and slides along the coulisse to a second end of the coulisse, the elastic plug is inserted into the socket, and when the battery is being disassembled, the elastic plug is withdrawn from the socket under force, and the convex slider slides from the second end of the coulisse to the first end of the coulisse and slides out from the end face of the first end.

8. An electric tool, comprising the motor according to claim 1 and the operating handle for the electric tool, wherein the operating handle comprises the transmission gear box and a holding handle, the holding handle is fixedly connected to the transmission gear box, an end of the transmission gear box that fits with an operation head of the electric tool is a front end, an end of the transmission gear box that fits with the motor is a rear end, the front end is provided with an operation head connector, the operation head connector is configured to connect the operation head, the rear end is configured with the assembly hole for shaft for fitting with the motor shaft of the motor, the second cross section of the assembly hole for shaft is non-circular, and the rear end is further provided with the connection structure for motor, wherein the motor is detachably connected to the operating handle.

9. The electric tool according to claim 8, further comprising an identification assembly, wherein the identification assembly comprises a controller, a memory, a detection device and an output unit, the detection device, the output unit, and the memory are in communication with the controller respectively, the detection device comprises at least one of a camera or an acoustic wave detector, the detection device is configured to detect a target material to be machined under a control of the controller, a variety of mapping relationships between detection data and material information are stored in the memory, the controller is configured to determine the material information of the target material to be machined based on the detection data of the detection device in combination with the variety of mapping relationships stored in the memory, and the output unit is configured to output the material information of the target material to be machined under the control of the controller.

10. An electric tool, comprising a motor and an operating handle for the electric tool, wherein the motor comprises a motor body and a motor shaft with a first end connected to an inside of the motor body and a second end protruding out of the motor body, a first cross section of the motor shaft perpendicular to an axial direction of the motor shaft is non-circular, a shape and a size of a second cross section of an assembly hole for shaft in the operating handle are matched with a shape and a size of the first cross section, the second cross section is perpendicular to a depth direction of the assembly hole for shaft, and the assembly hole for shaft allows the motor shaft to extend into a transmission gear box of the operating handle for assembly, the motor body is provided with a connection structure for handle, and the connection structure for handle is configured to fit with a connection structure for motor at the operating handle to realize a detachable assembly of the motor on the operating handle, and the operating handle comprises the transmission gear box and a holding handle, the holding handle is fixedly connected to the transmission gear box, an end of the transmission gear box that fits with an operation head of the electric tool is a front end, an end of the transmission gear box that fits with the motor is a rear end, the front end is provided with an operation head connector, the operation head connector is configured to connect the operation head, the rear end is configured with the assembly hole for shaft for fitting with the motor shaft of the motor, the second cross section of the assembly hole for shaft is non-circular, and the rear end is further provided with the connection structure for motor, and the motor is detachably connected to the operating handle.

\* \* \* \* \*